United States Patent
Koyama et al.

[11] Patent Number: 5,914,897
[45] Date of Patent: Jun. 22, 1999

[54] FIFO MEMORY DEVICE HAVING ADDRESS DETECTION PORTION

[75] Inventors: Masayuki Koyama; Michiru Hori, both of Tokyo, Japan

[73] Assignee: Mitsubishi Denki Kabushiki Kaisha, Tokyo, Japan

[21] Appl. No.: 08/990,801

[22] Filed: Dec. 15, 1997

[30] Foreign Application Priority Data

Jul. 25, 1997 [JP] Japan .................................. 9-200097

[51] Int. Cl.$^6$ .................................................. G11C 16/04
[52] U.S. Cl. .............................. 365/189.01; 365/189.02; 365/221; 365/189.04
[58] Field of Search ........................ 365/189.01, 189.02, 365/189.04, 241

[56] References Cited

U.S. PATENT DOCUMENTS

| | | | |
|---|---|---|---|
| 5,220,529 | 6/1993 | Kohiyama et al. | 365/189.01 |
| 5,267,191 | 11/1993 | Simpson | 365/189.04 |
| 5,305,253 | 4/1994 | Ward | 365/189.01 |

FOREIGN PATENT DOCUMENTS 2-168496  6/1990  Japan .

*Primary Examiner*—David Nelms
*Assistant Examiner*—David Lam
*Attorney, Agent, or Firm*—Burns, Doane, Swecker & Mathis, L.L.P.

[57] ABSTRACT

The configuration of a first-in first-out semiconductor storage device is simplified. A write address generating combinational circuit portion (100A) including no sequential circuits generates write addresses by using read addresses generated by a read counter portion (7).

4 Claims, 9 Drawing Sheets

FIFO MEMORY DEVICE HAVING ADDRESS DETECTION PORTION

BACKGROUND OF THE INVENTION

1. Field of the Invention

The present invention relates to a Semiconductor storage device of first-in first-out system (hereinafter referred to as a FIFO device).

2. Description of the Background Art

A FIFO device is incorporated in a transmission system for digital data, for example, to perform FIFO processing. In the FIFO processing, transmitted data are stored and the stored data are sent out in the order in which the data were transferred, which is performed in accordance with a clock, as shown in FIG. 6, for example.

FIG. 6 is a block diagram for explaining the outline of a FIFO device used for the purpose of FIFO processing of data in a digital transmission system. In FIG. 6, the FIFO device 1 mediates between a source circuit 2 and a destination circuit 3 in transmission of data.

The FIFO device 1 is supplied with a clock clk from a clock generator 4 and receives a reset signal rst from a reset signal generating circuit 5. The FIFO device 1 includes a random access memory (hereinafter referred to as a RAM) 6 for storing the transmitted data, a read counter portion 7 for generating read addresses used in the RAM 6 and a write counter portion 8 for generating write addresses used in the RAM 6.

FIG. 7 shows an example of relation among the read address RA, the write address WA, the read data dout and the write data din.

In the data stored in the RAM 6, data at the read address RA which is given at the time t1 at which the clock clk falls is read as the data dout and the data din transferred from the source circuit 2 is written into the write address WA which is given to the RAM 6 at the time t2 at which the clock clk rises.

The write counter portion 8 is set so that it provides an output value which is smaller by one than the output value from the read counter portion 7, for example. In this case, with the next clock, an access can be made to the write address equal to the read address with which the data was read, so that the data read from the RAM 6 can be written in an earlier-first order.

Next, referring to FIG. 8 and FIG. 9, configurations of the write counter portion 8 and the read counter portion 7 will be described for the case in which the number of data stored in the FIFO device is a power of 2. For example, the write counter portion 8 includes a D flip-flop 10 and an inverter 20 for dividing the clock clk by 2, a half adder 11 for adding the output of the D flip-flop 10 obtained by dividing the clock clk by 2 and the sum output provided by itself one clock earlier, a half adder 12 for adding the carry output of the half adder 11 and the one-clock-earlier sum output of itself, a half adder 13 for adding the carry output of the half adder 12 and the one-clock-earlier sum output of itself, D flip-flops 17–19 for respectively holding the sum outputs of the corresponding half adders 11–13, and four AND gates 21, 14–16 for respectively resetting the corresponding D flip-flops 10, 17–19. The output of the write counter portion 8 is 4 bits.

The reset signal rst is provided to the input terminal 23 and the clock clk is provided to the input terminal 22. The output value of the write counter portion 8 is outputted from the output terminal 24 as the write address.

The output of the AND gate 21 obtained from the AND of the reset signal rst and the output of the inverter 20 is captured as data for the D flip-flop 10. The inverter 20 inverts the output from the D flip-flop 10. The AND gates 14–16 are all supplied with the reset signal rst at their respective inputs on one side, and with the outputs from the corresponding half adders 11–13 at their respective inputs on the other side.

The read counter portion 7, for example, includes a D flip-flop 30, an NAND gate 42, and inverters 40, 41 for dividing the clock clk by 2, a half adder 31 for adding the output of the D flip-flop 30 obtained by dividing the clock clk by 2 and the sum output provided by itself one clock earlier, a half adder 32 for adding the carry output of the half adder 31 and the one-clock-earlier sum output of itself, a half adder 33 for adding the carry output of the half adder 32 and the one-clock-earlier sum output of itself, D flip-flops 37–39 for respectively holding the sum outputs of the corresponding half adders 31–33, and four AND gates 42, 34–36 for respectively resetting the corresponding D flip-flops 30, 37–39. The output of the read counter portion 7 is 4 bits long.

The reset signal rst is applied to the input terminal 44, and the clock clk is applied to the input terminal 43. The output value of the read counter portion 7 is outputted from the output terminal 45 as the read address.

The output of the NAND gate 42 obtained by NANDing the reset signal rst and the output of the inverter 41 becomes data for the D flip-flop 30. The inverters 40, 41 buffer the output from the D flip-flop 30. One input to each of the AND gates 34–36 is the reset signal rst and the other input to each is the sum output from the corresponding one of the half adders 31–33.

When the reset signal is set at "1," the write counter portion 8 shown in FIG. 8 increases the count starting at "0000" while the read counter portion 7 shown in FIG. 9 increases the count starting at "0001," to implement the first-in first-out operation. Numbers enclosed in "" indicate binary numbers, and "1" corresponds to output of a high level and "0" corresponds to output of a low level.

Next, referring to FIG. 10 and FIG. 11, configurations of the write counter portion 8 and the read counter portion 7 will be described for the case wherein the number of data stored in the FIFO device is not a power of 2. For example, the write counter portion 8 includes a D flip-flop 50, an inverter 51 and an AND gate 52 for dividing the clock clk by 2, a half adder 53 for adding the output of the D flip-flop 50 obtained by dividing the clock clk by 2 and the sum output provided by itself one clock earlier, a half adder 54 for adding the carry output of the half adder 53 and the one-clock-earlier sum output of itself, a half adder 55 for adding the carry output of the half adder 54 and the one-clock-earlier sum output of itself, a D flip-flop 59 for holding the negated sum output of the half adder 53, D flip-flops 60, 61 for respectively holding the sum outputs of the corresponding half adders 54, 55, three AND gates 56–58 for respectively resetting the corresponding D flip-flops 59–61, and an NAND gate 62 and an AND gate 63 for resetting the write counter portion 8 when the count value outputs a certain value, or "1101." The output of the write counter portion 8 is 4 bits long.

The reset signal rst is provided to the input terminal 65 and the clock clk is provided to the input terminal 64. The output value of the write counter portion 8 is outputted from the output terminal 66 as the write address.

All of the AND gates 56–58 are supplied with the output from the AND gate 63 at their respective inputs on one side and with the sum outputs from the corresponding half adders 53–55 at their respective inputs on the other side, and the outputs obtained by ANDing them are inputs to the corresponding D flip-flops 59–61. The D flip-flop 50 receives the output from the AND gate 52 as its input. The output of the AND gate 52 is generated by ANDing the output of the AND gate 63 and the output of the inverter 51. The AND gate 63 outputs the AND of the reset signal rst and the output from the NAND gate 62, and the NAND gate 62 outputs the NAND of the outputs from the D flip-flops 50, 60, 61 and the inverse output of the D flip-flop 59 (a negation of the second-least significant bit in the write address).

The read counter portion 7, for example, includes a D flip-flop 70 and an NAND gate 71 for dividing the clock clk by 2, a half adder 72 for adding the output of the D flip-flop 70 obtained by dividing the clock clk by 2 and the sum output provided by itself one clock earlier, a half adder 73 for adding the carry output of the half adder 72 and the one-clock-earlier sum output of itself, an EXOR gate 74 for outputting the exclusive OR of the carry output of the half adder 73 and the one-clock-earlier output of itself, D flip-flops 80–82 for respectively holding the sum outputs of the corresponding half adders 72, 73 and the output from the EXOR gate 74, and AND gates 76–79 and an NAND gate 75 for resetting the corresponding D flip-flops 80–82. The output of the read counter portion 7 is 4 bits.

When the output value of the read counter portion 7 outputs a certain value, or "1101," the NAND gate 75 outputs "0" to reset the read counter portion 7.

The reset signal rst is applied to the input terminal 84 and the clock clk is applied to the input terminal 83. The output value of the read counter portion 7 is outputted from the output terminal 85 as the read address.

The AND gates 77–79 are all supplied with the output from the AND gate 76 at their respective inputs on one side, and with the sum output from the half adder 72, the sum output from the half adder 73, and the output from the EXOR gate 74 at their respective inputs on the other side. The NAND gate 75 outputs the NAND of the outputs from the D flip-flops 70, 81, 82 and the inverse output from the D flip-flop 80 (a negation of the second-least significant bit in the read address). The output of the NAND gate 71 generated from the NAND of the reset signal rst and the output of the D flip-flop 70 is provided as data for the D flip-flop 70.

As described above, the conventional semiconductor storage device requires two counter portions to implement the FIFO function, which raises the problem that the circuit scale is large.

SUMMARY OF THE INVENTION

A first aspect of the present invention relates to a first-in first-out semiconductor storage device which comprises a storage portion for writing data into a write address and reading data from a read address in accordance with a clock. According to the present invention, the semiconductor storage device comprises: a counter portion for counting the clock to repeat the operation of sequentially outputting values circulating between a first value and a second value to generate the write address or the read address; and a combinational circuit portion for generating a value equal to an output value provided a predetermined number of clocks earlier by the counter portion as the write address or the read address which is not generated in the counter portion.

Preferably, according to a second aspect, in the semiconductor storage device, the combinational circuit portion comprises a detecting portion for detecting that the output value from the counter portion has a predetermined, third value existing between the first value and the second value, and an operating portion for generating a value shifted by the predetermined number of clocks by operation with the output value of the counter portion and a fourth value when the detecting portion does not detect the predetermined third value, and generating a predetermined, fifth value existing between the first value and the second value when the detecting portion detects the predetermined third value.

Preferably, according to a third aspect, in the semiconductor storage device, the fourth value is 1.

According to the semiconductor storage device of the first aspect, the combinational circuit used in place of the conventionally used counter has a simpler configuration than the counter, which simplifies the configuration of the semiconductor storage device.

According to the semiconductor storage device of the second aspect, the combinational circuit is formed with the detecting portion and the operating portion, which enables more versatile design.

According to the semiconductor storage device of the third aspect, since one is added or subtracted, the detecting portion is only required to detect a single predetermined third value, which facilitates simplification of the configuration.

The present invention has been made to solve the problem stated above, and an object of the present invention is to replace a counter portion with a combinational circuit having a simpler configuration to simplify the configuration of the semiconductor storage device.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
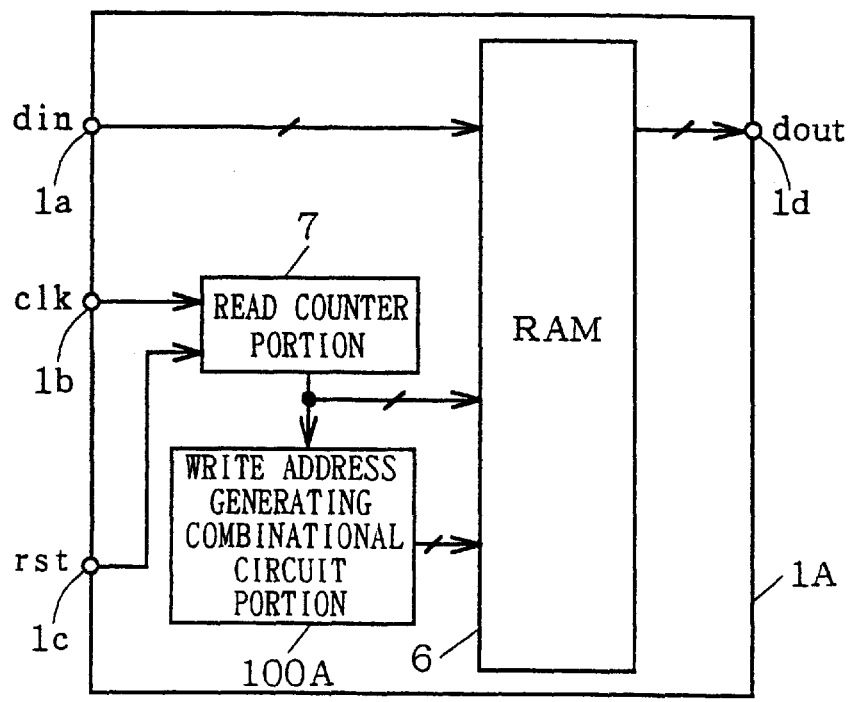
FIG. 1 is a block diagram showing a configuration of a semiconductor storage device according to a first preferred embodiment of the present invention.
Figure 6:
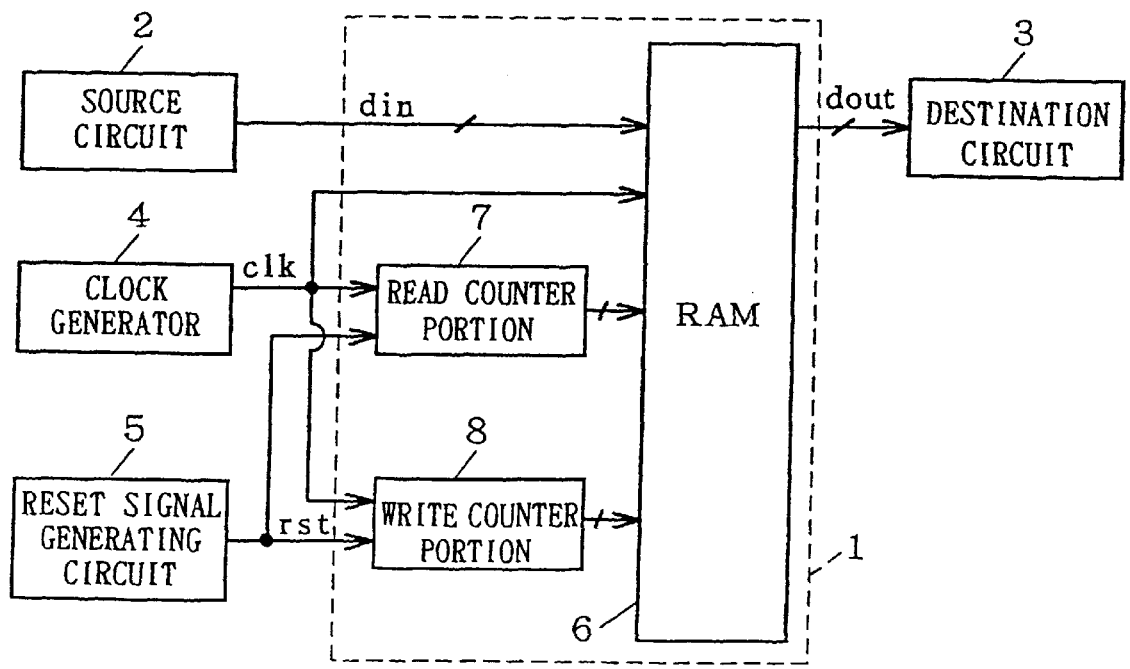
FIG. 6 is a block diagram showing a configuration of a conventional semiconductor storage device.
Figure 7:
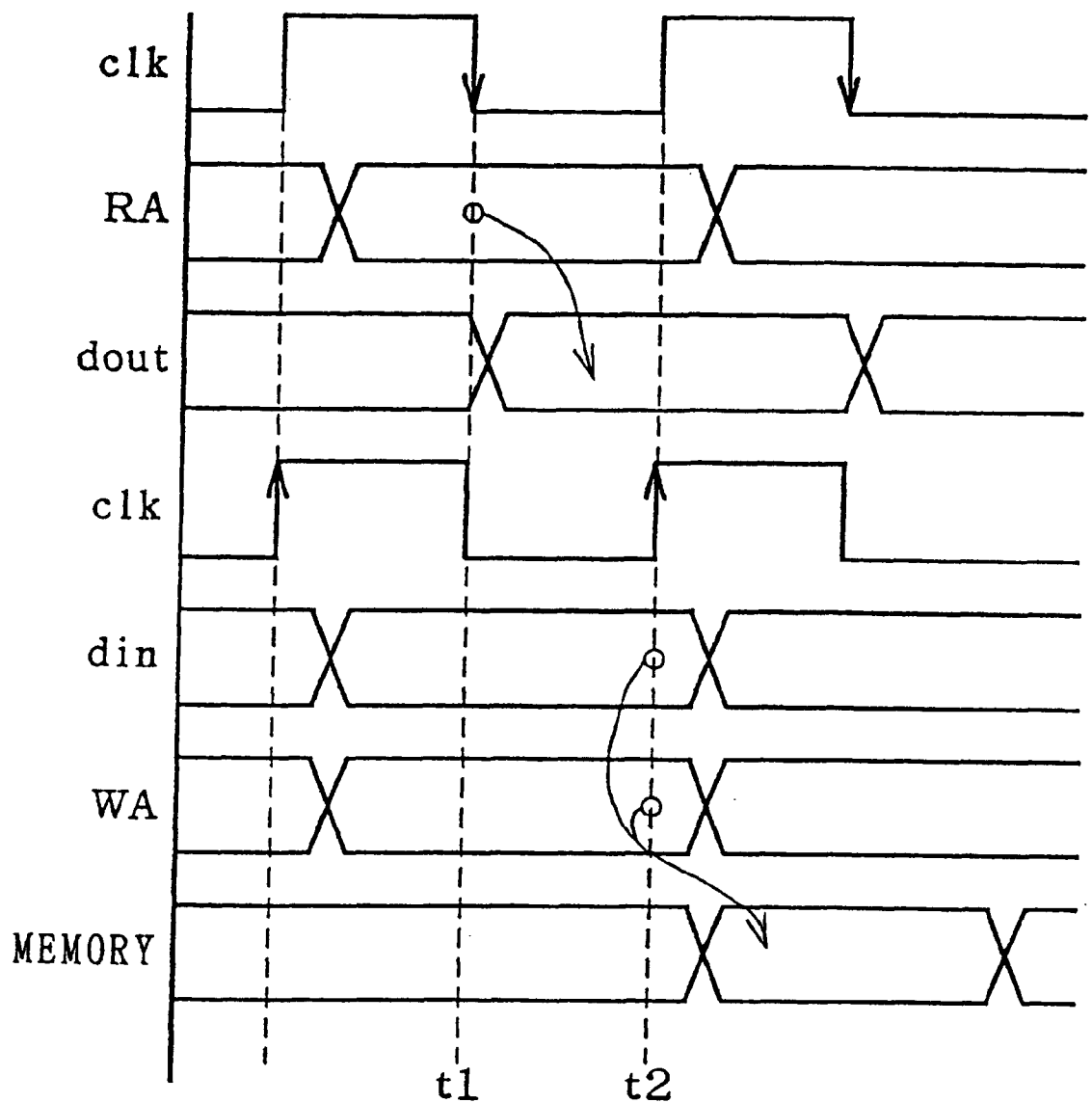
FIG. 7 is a timing chart showing the operation of the RAM shown in FIG. 6.
Figure 8:
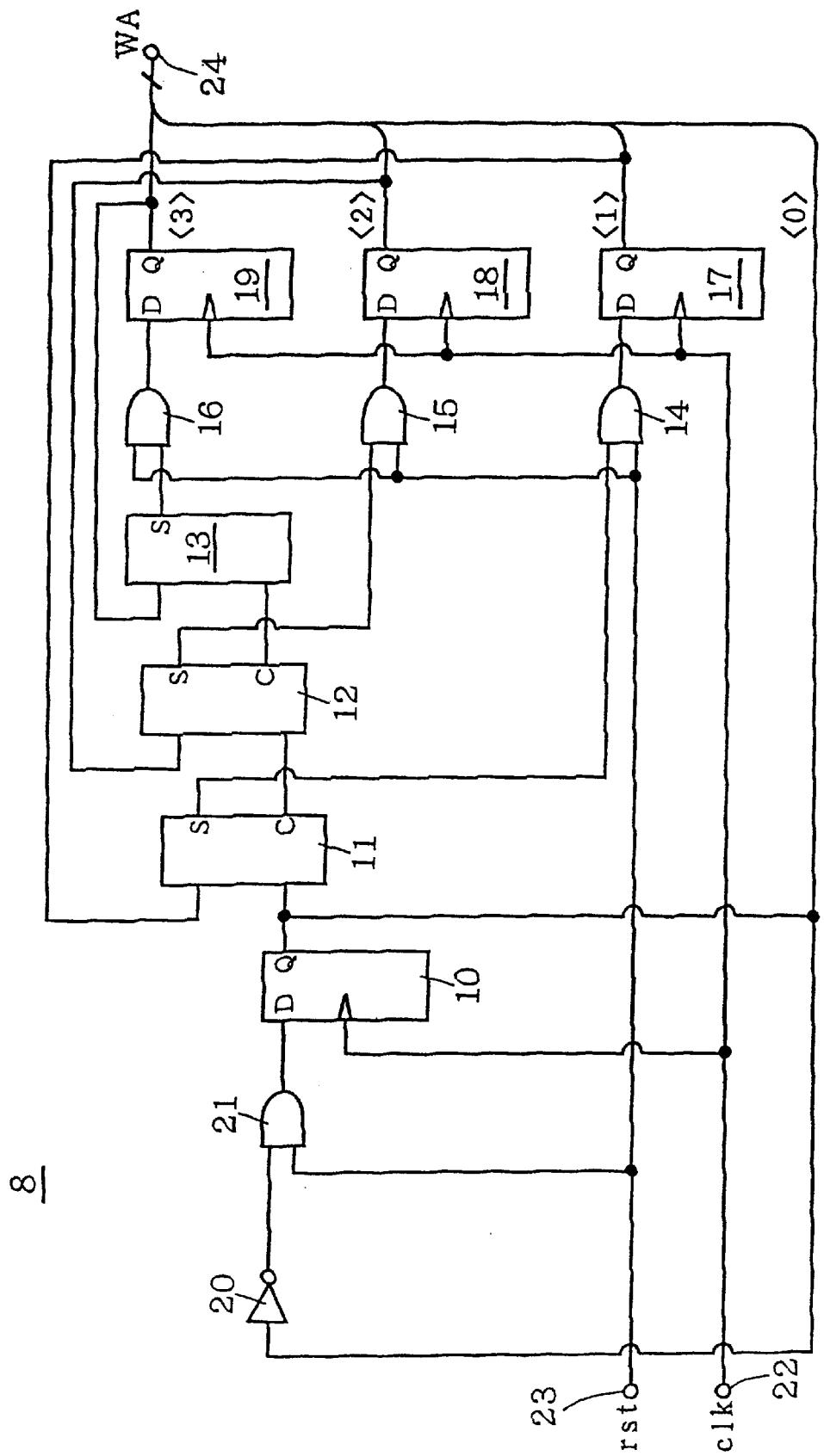
FIG. 8 is a logic diagram showing an example of the configuration of the conventional write counter portion.

A first preferred embodiment of the present invention will now be described referring to FIGS. 1 to 3. FIG. 1 is a block diagram showing the configuration of a FIFO device according to a first preferred embodiment of the present invention. In FIG. 1, 100A denotes a write address generating combinational circuit portion provided in the FIFO device 1A and receiving the output value, or read addresses, from the read counter portion 7 to generate write addresses. Other characters corresponding to those in the FIG. 6 show the corresponding parts.

Figure 2:
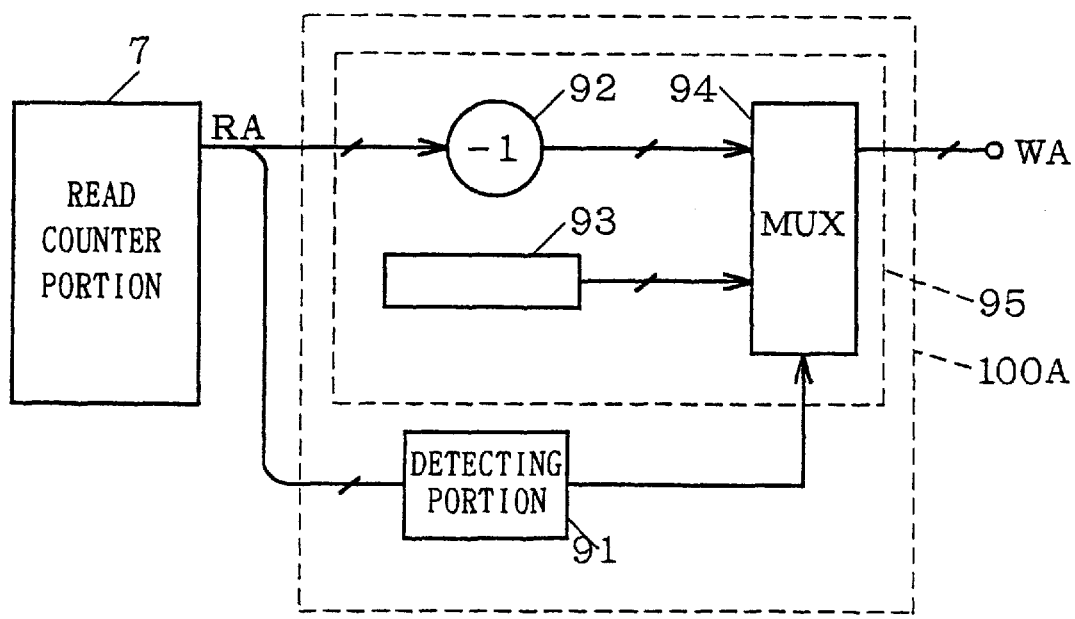
FIG. 2 is a conceptual diagram for describing the configuration of the write address generating combinational circuit portion according to the first preferred embodiment.
Figure 11:
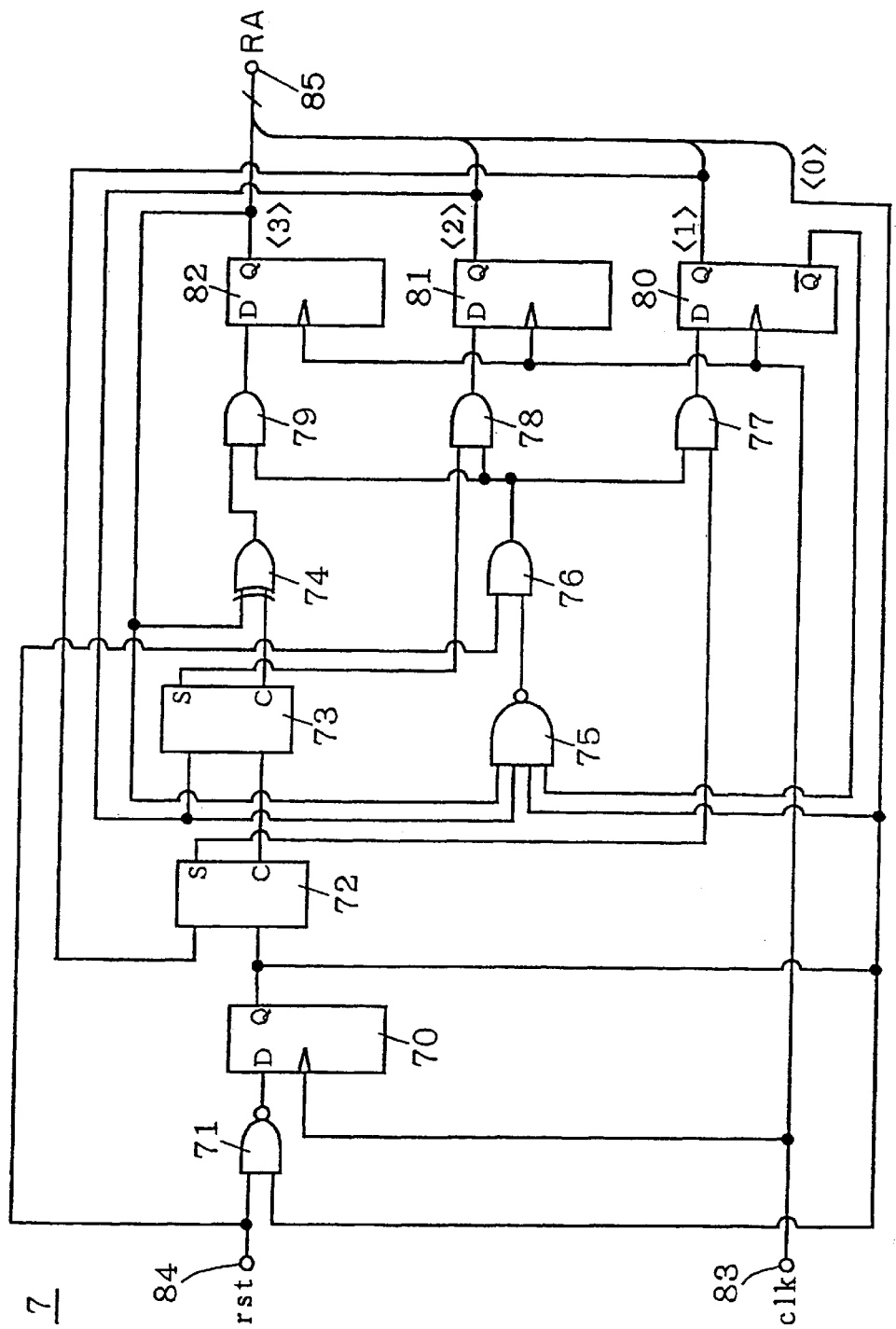
FIG. 11 is a logic diagram showing another example of the configuration of the conventional read counter portion.

FIG. 2 is a diagram showing the concept of the configuration of the combinational circuit portion 100A for generating write addresses. In FIG. 2, 91 denotes a detecting portion for detecting that the read address RA is at a certain value, 92 denotes a subtracting circuit for subtracting 1 from the read address RA, 93 denotes a certain address generating circuit for generating a certain value in the write addresses WA, and 94 denotes a multiplexer for selecting outputs from the subtracting circuit 92 and the certain address generating circuit 93 depending on the output from the detecting portion 91. The subtracting circuit 92, the certain address generating circuit 93 and the multiplexer 94 form an operating portion 95. When the configuration shown in FIG. 11 is used as the read counter portion 7, for example, the detecting portion 91 detects whether the read address RA is "0000." When the detecting portion 91 detects "0000," the multiplexer 94 outputs "1101" generated by the certain address generating circuit 93. When the detecting portion 91 does not detect "0000," the multiplexer 94 outputs a value obtained by subtracting 1 from the read address RA generated by the subtracting circuit 92.

Figure 3:
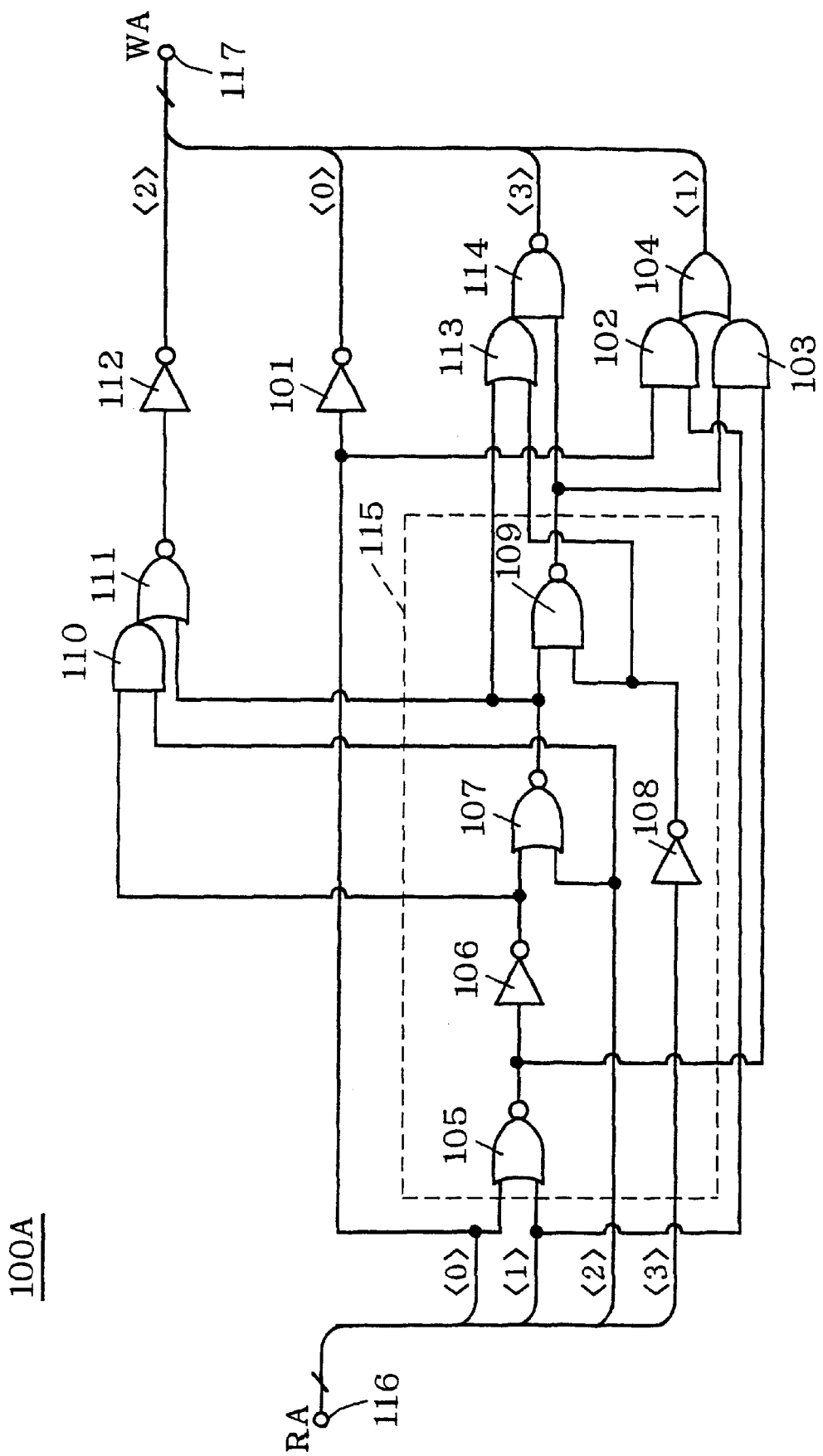
FIG. 3 is a logic diagram showing a configuration of the write address generating combinational circuit portion according to the first preferred embodiment.

FIG. 3 is a logic diagram showing an example of a configuration of the write address generating combinational circuit portion 100A actually designed on the basis of the concept. Note, however, that many parts are used in common to compress the circuit configuration and relations among the parts, such as the detecting portion 91, are ambiguously separated. Suppose that, for the configuration of the read counter portion 7, the read counter portion 7 having the configuration shown in FIG. 11 is used as in the case of the conventional device.

The read address RA outputted from the read counter portion 7 is applied to the input terminal 116 and the output portion value of the write address generating combinational circuit portion 100A is outputted from the output terminal 117 as the write address WA.

In order to generate the write address, the write address generating combinational circuit portion 100A outputs the same value as the output value outputted one clock earlier from the read counter portion 7 except when the output value of the read counter portion 7 is "0000." When the output value from the read counter portion 7 is "0000," it outputs a certain value "1101" corresponding to that. Thus the combinational circuit portion 100A repeats the operation of sequentially outputting values in the range between "0000" and "1101" while outputting values shifted by one clock with respect to the outputs from the read counter portion 7.

The write address generating combinational circuit portion 100A includes a detecting portion 115 for detecting whether the read address is "0000."

The detecting portion 115 is formed of an NOR gate 105 for outputting the NOR of the least significant bit and the second-least significant bit in the read address, an inverter 106 for inverting the output from the NOR gate 105, an NOR gate 107 for outputting the NOR of the output from the inverter 106 and the second-most significant bit in the read address, an inverter 108 for inverting the most significant bit in the read address, and an NAND gate 109 for outputting the NAND of the output from the NOR gate 107 and the output from the inverter 108.

The output of the inverter 101 which inverts the least significant bit in the read address outputted from the read counter portion 7 corresponds to the least significant bit in the write address. The least significant bit in the write address can be delayed by one clock with respect to the least significant bit in the read address.

The AND gate 102 outputs the AND of the least significant bit and the second-least significant bit in the read address. The AND gate 103 outputs the AND of the output of the NAND gate 109 and the output of the NOR gate 105. That is to say, the output from the AND gate 102 is "1" when both of the first digit and the second digit in the read address are "1." The output from the AND gate 103 is "1" when both the first and second digits in the read address are "0," except in the case of "0000." Then ORing the outputs of the AND gates 102, 103 with the OR gate 104 enables output of "1" when the first digit and the second digit in the read address have the same value, so that the second-least significant bit in the write address can be delayed by one clock.

The AND gate 110 outputs the AND of the second-most significant bit in the read address and the output from the inverter 106. That is to say, the AND gate 110 outputs "1" except when both the least significant bit and the second-least significant bit are "0" in a read address in which the second-most significant bit is "1." Since the output of the NOR gate 107 in the detecting portion 115 outputs "1" when all of the first to third digits in the read address are "0," outputting the OR of the output of the AND gate 110 and the output of the NOR gate 107 with the circuit formed of the NOR gate 111 and the inverter 112 delays the second-most significant bit in the write address by one clock with respect to the second-most significant bit in the read address.

The OR gate 113 ORs the output of the NOR gate 107 and the output of the inverter 108 to output "1" not only in the case where the fourth position of the read address is "0," but also in the case of "1000." The NAND gate 114 outputs "0" when the OR gate 113 outputs "1," except in the case of "0000." Thus the most-significant bit in the write address can be delayed by one clock with respect to the most significant bit in the read address.

As described above, since the write address generating combinational circuit portion 100A uses no sequential circuits such as the D flip-flops, the circuit scale can be reduced as compared with the conventional write counter portion 8. Furthermore, since it is easy to share the detecting portion and other parts, the circuit scale can be further reduced in some cases.

Second Preferred Embodiment

Figure 4:
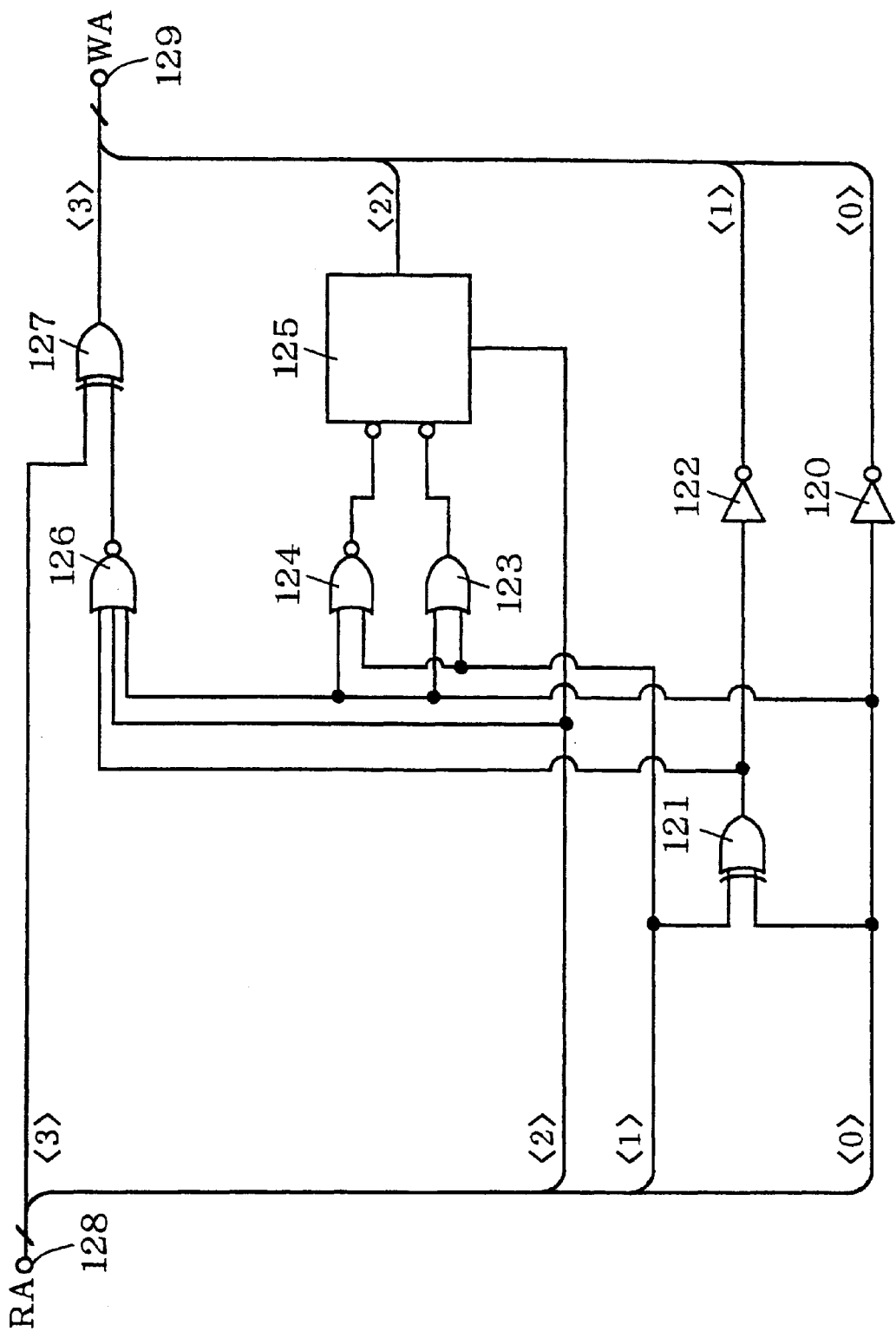
FIG. 4 is a logic diagram showing a configuration of the write address generating combinational circuit portion according to a second preferred embodiment.
Figure 9:
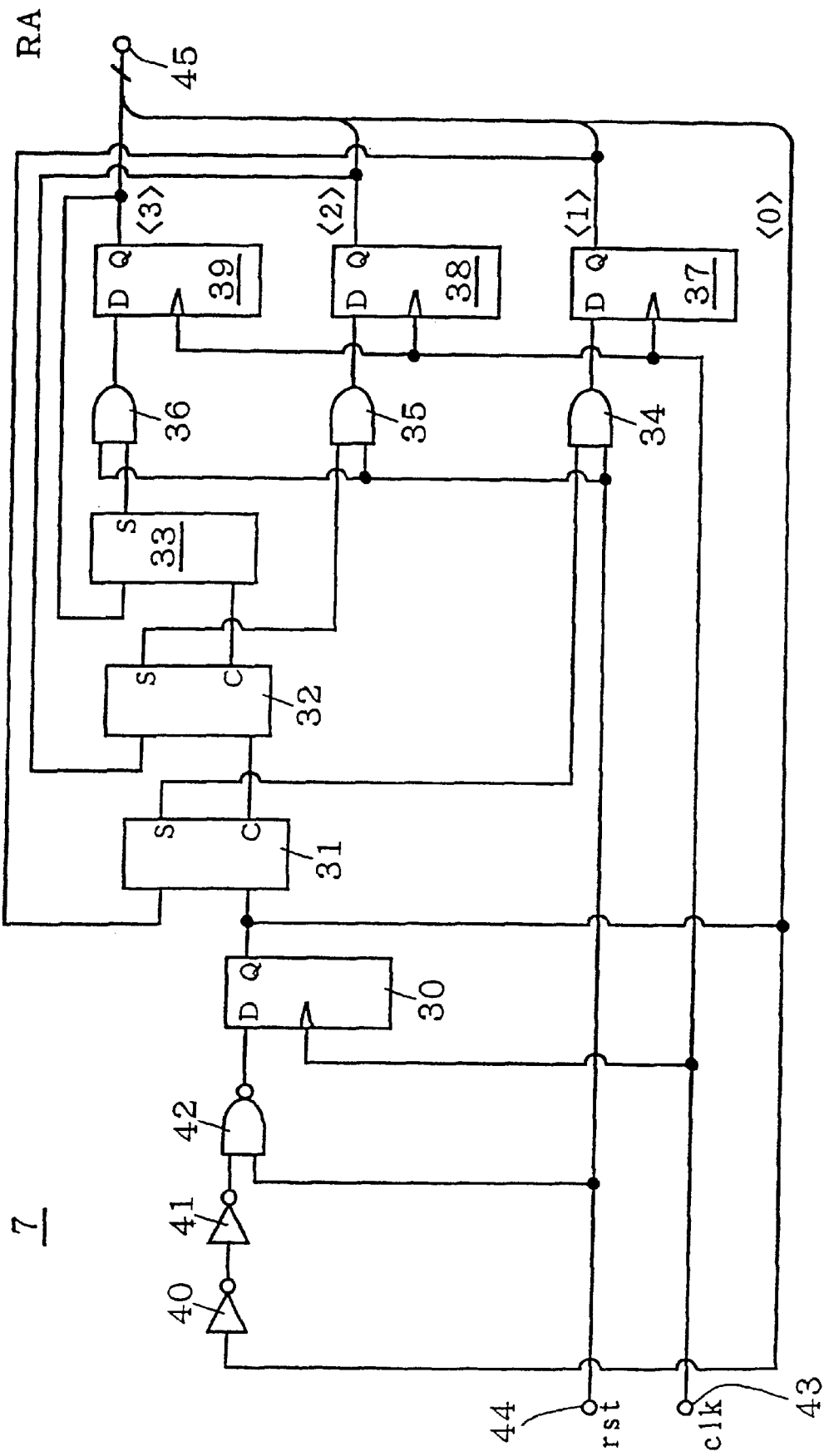
FIG. 9 is a logic diagram showing an example of the configuration of the conventional read counter portion.
Figure 10:
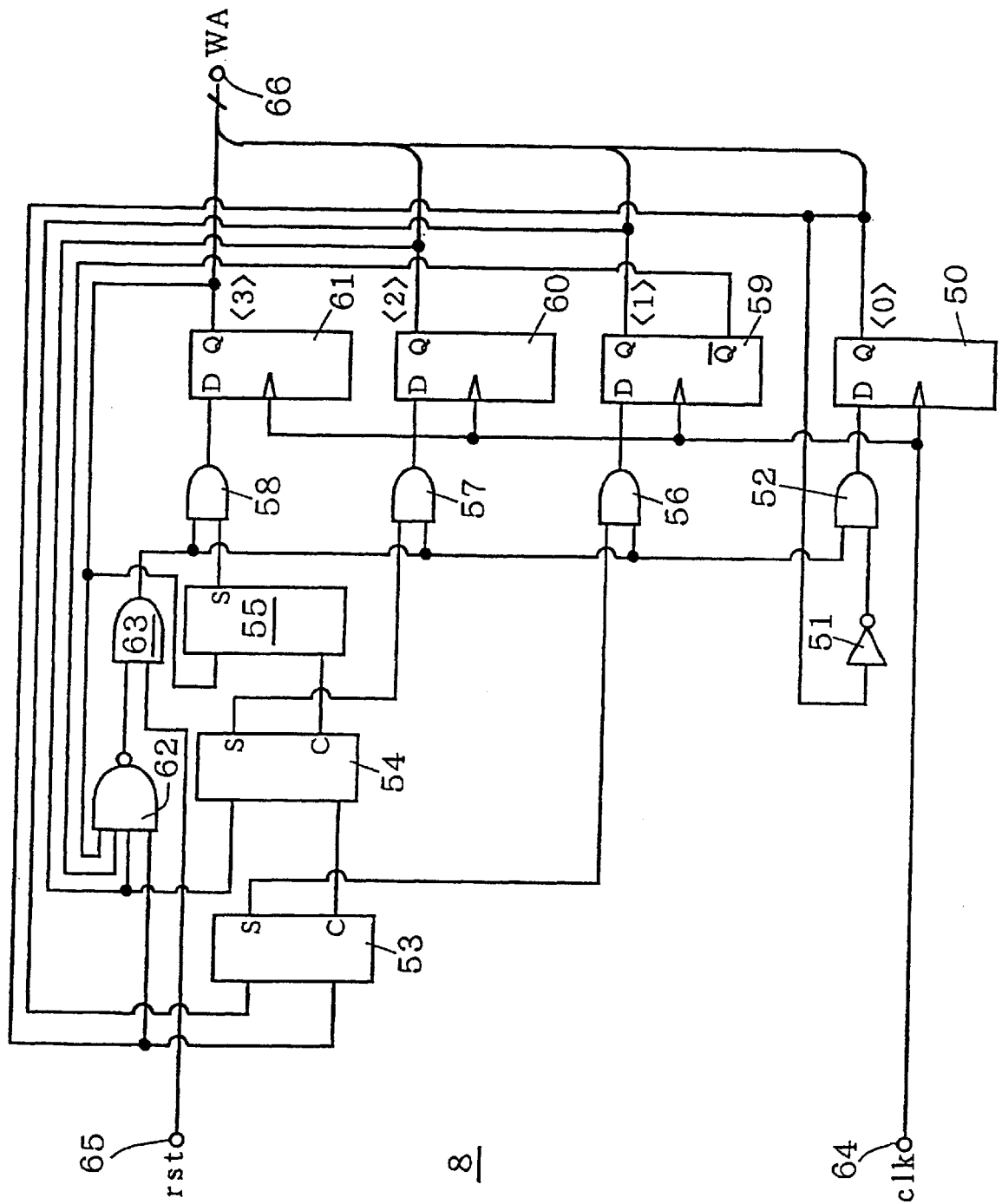
FIG. 10 is a logic diagram showing another example of the configuration of the conventional write counter portion.

FIG. 4 is a logic diagram showing another example of a configuration of the write address generating combinational circuit portion 100A. Here, as for the configuration of the read counter portion 7, the read counter portion 7 having the configuration shown in FIG. 9 is used as in the case of the conventional device.

In order to generate the write addresses, the write address generating combinational circuit portion 100A outputs the same value as the output value provided one clock later from the read counter portion 7 except when the output value of the read counter portion 7 is "0000." When the read counter portion 7 outputs the value "0000," it outputs the corresponding value "1111" to repeat the operation of sequentially outputting values in the range from "0000" to "1111" while outputting values shifted by one clock with respect to the outputs of the read counter potion 7.

However, since the configuration can be made to output "1111" when the output of the read counter portion 7 is "0000" by subtracting "1" from it, the write address generating combinational circuit portion 100A can generate the write addresses for FIFO operation only with the function of providing values leading the read addresses by clock as the write addresses, without detecting "0000" in the detecting portion.

The read address RA outputted from the read counter portion 7 is applied to the input terminal 128 and the output value of the write counter portion 8 is outputted from the output terminal 129 as the write address WA.

The output from the inverter 120 which inverts the least significant bit in the read address outputted from the read counter portion 7 is provided as the least significant bit in the write address. The least significant bit in the write address can be one clock delayed with respect to the least significant bit in the read address.

The EXOR gate 121 outputs the exclusive OR of the least significant bit and the second-least significant bit in the read address. That is to say, it outputs "0" when the least significant bit and the second-least significant bit in the read address have the same value. The output from the EXOR gate 121 is inverted in the inverter 122, so that the second-least significant bit in the write address can be delayed by one clock with respect to the second-least significant bit in the read address.

The OR gate 123 ORs the least significant bit and the second-least significant bit in the read address to output "0" only when both of the least significant bit and the second-least significant bit in the read address are "0." The NOR gate 124 NORs the least significant bit and the second-least significant bit in the read address to output "1" only when both of the least significant bit and the second-least significant bit in the read address are "0." Accordingly, switching with the selector 125 when the second-most significant bit in the read address becomes "1" delays the second-most significant bit in the write address outputted from the selector 125 by one clock with respect to the bit in the third figure in the read address.

The NOR gate 126 NORs the least significant bit in the read address, the output of the EXOR gate 121, and the second-most significant bit in the read address to output "1" when all of the bits in the first to third positions in the read address are "0." The EXOR gate 127 EXORs the output of the NOR gate 126 and the most significant bit in the read address to output "1" when the read address is "0000" and output "0" when the read address is "1000." This causes the most significant bit in the write address outputted from the EXOR gate 127 to delay by one clock with respect to the most significant bit in the read address.

As described above, since the write address generating combinational circuit portion 100A uses no sequential circuits such as the D flip-flops, the circuit scale can be reduced as compared with the conventional write counter portion 8. Furthermore, since it is easy to share the parts, the circuit scale can be further reduced in some cases.

Figure 5:
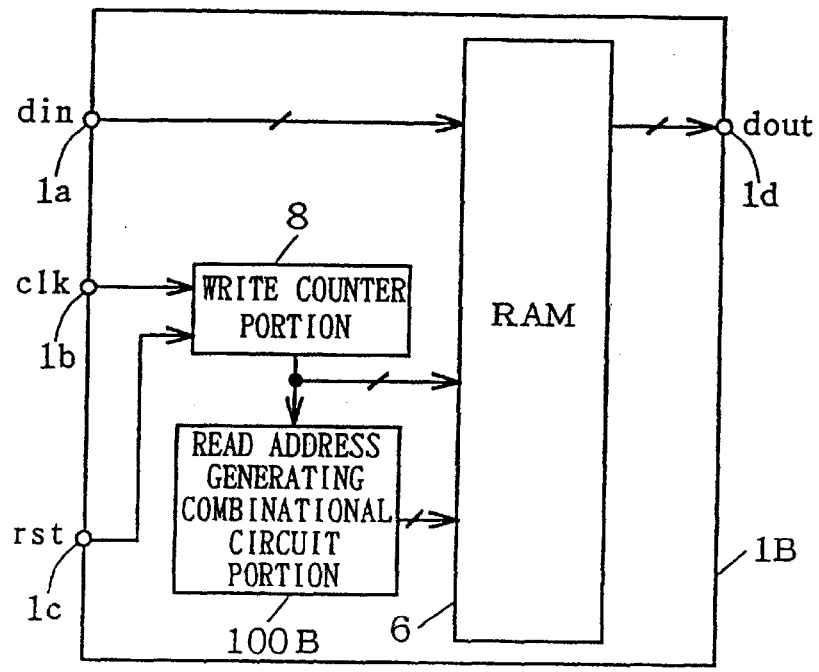
FIG. 5 is a block diagram showing another example of the semiconductor storage device of the invention.

Described in the first and second preferred embodiments above is the write address generating combinational circuit portion 100A which generates write addresses by using read addresses outputted from the read counter portion 7. However, as shown in FIG. 5 as a FIFO device 1B, it may be configured as a read address generating combinational circuit portion 100B which generates read addresses by using write addresses outputted from the write counter portion 8, which provides the same effects as the first and second preferred embodiments. In this case, the read addresses outputted from the read address generating combinational circuit portion 100B are obtained by adding a certain value to the write addresses.

Although an up counter is used for the read counter portion 7 or the write counter portion 8 in the above-described first and second preferred embodiments, a down counter may be used. In this case, the write address generating combinational circuit portion 100A must provide addresses larger than outputs from the read counter portion 7. That is to say, a certain value must be added to the read addresses. In the case of the read address generating combinational circuit portion 100B, it must provide addresses smaller than the outputs from the write counter portion 8, or, a certain value must be subtracted from the write addresses.

In the first preferred embodiment described above, since 1 is subtracted from the read addresses in the write address generating combinational circuit portion 100A, it suffices to detect only the value "0000," which is advantageous in simplifying the structure. However, it is not impossible to form a write address generating combinational circuit portion 100A in which a value other than 1 is subtracted from the read addresses. The same is true for the read address generating combinational circuit portion 100B.

While the invention has been described in detail, the foregoing description is in all aspects illustrative and not restrictive. It is understood that numerous other modifications and variations can be devised without departing from the scope of the invention.

We claim:

1. A first-in first-out semiconductor storage device which comprises a storage portion for writing data into a write address and reading data from a read address in accordance with a clock, the semiconductor storage device comprising:

a counter portion for counting the clock to repeat the operation of sequentially outputting values circulating between a first value and a second value to generate said write address or said read address; and a combinational circuit portion for generating a value equal to an output value provided a certain number of clocks earlier by said counter portion as said write address or said read address which is not generated in said counter portion.

2. The semiconductor storage device according to claim 1, wherein said combinational circuit portion comprises, a detecting portion for detecting that the output value from said counter portion has a certain, third value existing between said first value and said second value, and an operating portion for generating a fourth value shifted by said certain number of clocks by operation between the output value of said counter portion and a fifth value when said detecting portion does not detect said third value, and generating a certain, sixth value existing between said first value and said second value when said detecting portion detects said third value.

3. The semiconductor storage device according to claim 2, wherein said fifth value is 1.

4. The semiconductor storage device according to claim 2, wherein said operating portion comprises, an address generating portion for generating said sixth value, a subtracting circuit for generating said fourth value by subtracting a certain value from the address outputted from said counter portion, and a multiplexer for selecting and outputting one of the output from said address generating portion and the output from the subtracting circuit in accordance with a result of detection in said detecting portion.

* * * * *